United States Patent [19]

McGinnis, deceased et al.

[11] 4,150,506
[45] Apr. 24, 1979

[54] FISHING ROD HOLDER

[76] Inventor: Charles P. McGinnis, deceased, late of Anaheim, Calif., by Alice M. McGinnis, administratrix, 1400 S. Douglas Rd. #124, Anaheim, Calif., 92806

[21] Appl. No.: 799,146
[22] Filed: May 23, 1977
[51] Int. Cl.² ............................................. A01K 97/10
[52] U.S. Cl. ........................................ 43/21.2; 248/523
[58] Field of Search ................ 43/21.2; 248/511, 517, 248/523, 524, 526, 530

[56] References Cited

U.S. PATENT DOCUMENTS

| 2,519,851 | 8/1950 | Reynolds | 43/21.2 |
| 2,877,828 | 3/1959 | Barnette, Jr. | 43/21.2 |
| 2,995,855 | 8/1961 | Bell | 43/21.2 |
| 3,021,101 | 2/1962 | Gliebe | 43/21.2 |
| 3,159,366 | 12/1964 | Knight | 43/21.2 |
| 3,515,263 | 6/1970 | Carlson | 43/21.2 |
| 3,582,028 | 6/1971 | Purdy | 248/523 |
| 3,815,853 | 6/1974 | Bahner | 248/524 |
| 3,881,269 | 5/1975 | Timmons | 43/21.2 |
| 4,017,998 | 4/1977 | Dumler | 43/21.2 |

FOREIGN PATENT DOCUMENTS 2255786  5/1974  Fed. Rep. of Germany ............ 43/21.2

*Primary Examiner*—William Pieprz
*Attorney, Agent, or Firm*—Robert D. Farkas

[57] ABSTRACT

A fishing rod holder which includes a spike for insertion into the ground, a platform affixed to the spike, and a hollow open-ended cylinder pivotally affixed to the platform, the cylinder for capturing and retaining therein the handle of a fishing rod.

5 Claims, 5 Drawing Figures

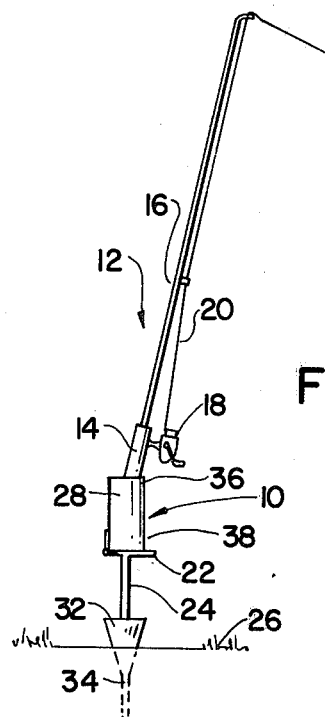
FIG. 1
FIG. 4
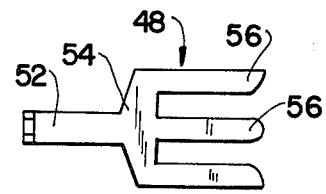
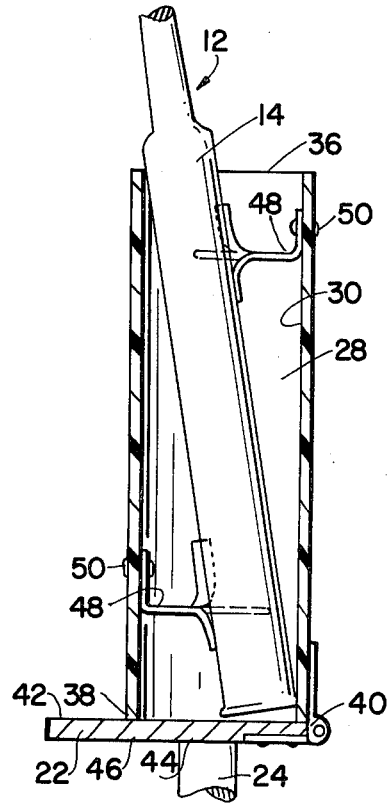
FIG. 3
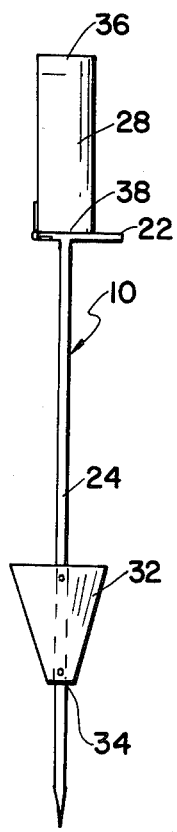
FIG. 2
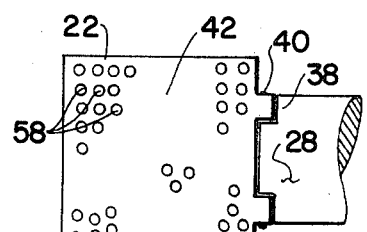
FIG. 5

FISHING ROD HOLDER

BACKGROUND OF THE INVENTION

1. Field of the Invention

The present invention relates to holders for fishing rods, and more particularly, to a fishing rod holder for insertion into the earth.

2. Description of the Prior Art

Presently, several fishing rod holders which are supported by insertion into the earth are known. These fishing rod holders provide various means for engaging a portion of the fishing rod. The primary drawback of known devices is the difficulty to insert the spike portions thereof into the earth. Frequently the rods are smooth and provide no sufficient area for gripping. Devices known which do provide a grip are relatively ineffective when the spike is inserted in hard ground. As a result the fishing rod holders may become easily damaged during insertion or may injure the user as a result of an accident occurring during insertion.

Devices presently known in the prior art include the combined fishing rod holder and signal device disclosed in U.S. Pat. No. 3,560,969 issued to D. W. Fleeman on Feb. 2, 1971. This device is a combined fishing rod holder and signal means which provides the fisherman with an apparatus which holds his fishing rod for him, the device being swivelly mounted on a stake or the like driven into a bank close to the water or mounted on a boat while fishing from a boat, the device having means which will signal the fisherman that a fish is biting or is caught on the hook and line by a visible signal light, an audible sound signal, or by both at the same time, the device being positioned so as to swivel on the support stake, allowing the fisherman at night to determine the direction in which the fish is biting on the line so that the fisherman may manipulate his rod and set the hook in a fish's mouth. Alternately, the support stake can be fitted into a bracket or clamp fastened to a boat. When this device is employed by insertion into the earth this action is facilitated by a footrest fixedly secured to a side of the stake. If the footrest is employed to facilitate insertion of the stake in hard earth, and pressure is applied thereon the stake may accidentally slip and injure the user as a result of the applied force not being directly above the longitudinal axis of the stake.

U.S. Pat. No. 3,834,057 issued to E. F. Jansa on Sept. 10, 1974 discloses a fishing rod holder having a standard and an insert mountable on a fishing rod for selectively engaging the standard. The insert is preferably in the shape of a hyperboloid of one sheet having parallel bases of different areas, and is secured on a reel mounting portion of the handle of a fishing rod by a bolt passing through an opening provided in the handle portion and engaging a threaded hole in the insert. A socket is provided on the standard for matingly receiving the insert, the base of smallest area first; the insert and socket may be advantageously provided with longitudinally extending splines and grooves, respectively, for preventing sway while permitting a rod to be rigidly held extending in any desired direction. To facilitate insertion of the standard into the ground pressure may be applied to the socket thereof. The socket provides an inadequate surface for contacting the foot of a user. This presents an unnecessary safety hazard if the standard is to be inserted into hard ground and the weight of the user must be placed thereagainst.

U.S. Pat. No. 3,862,508 issued to J. C. Morgan on Jan. 28, 1975 discloses a fishing pole holder which includes a support member arranged for being secured in a stationary position and provides a pole holding arm pivotally secured thereon. An alarm is activated by pivotal movement of the arm to an alarm actuating position. An arrangement is provided for resiliently biasing the arm when holding a pole in a selected at rest position which arrangement is preferably adjustable to permit setting of the amount of pull on a fishline necessary to actuate the alarm. The arm may have a slideable plate thereon to support a reel on the pole being held. A footplate is provided and is fixedly secured to the support member. As in the Fleeman Patent, foot pressure placed on this foot plate may cause the support member thereof to skid along the ground as a result of the force not being applied directly above the longitudinal axis of the support. This situation may lead to injury of the user aside from frustration in inserting the support member and possible separation of the foot plate therefrom.

The present invention overcomes the problems associated with the prior art by providing a fishing rod holder having means to facilitate the insertion of the spike portion thereof into the ground positively, without the risk of injury to the user.

SUMMARY OF THE INVENTION

Therefore, a primary object of the present invention is to provide a fishing rod holder which may be inserted positively into the ground with negligible risk of accident or injury to the user.

A further object is to provide a fishing rod holder which will not swivel in the ground once inserted therein.

A still further object is to provide a fishing rod holder which positively engages the handle of a fishing rod without requiring diligent fastening of clamps or other mechanical locking mechanisms.

Another object is to provide a fishing rod holder which may be manufactured in an extremely compact size.

Still another object is to provide a fishing rod holder which is simple in design, inexpensive to manufacture, and durable.

These objects, as well as further objects and advantages, of the present invention will become readily apparent after reading the description of a non-limiting illustrative embodiment and the accompanying drawing.

A fishing rod holder according to the principles of the present invention includes a rigid substantially flat platform having an upper surface and a lower surface; a spike fixedly secured to the lower surface of the platform, the longitudinal axis of the spike being substantially perpendicular to the lower surface; and a hollow open-ended cylinder forming a longitudinal chamber therein, the cylinder having a first end and a second end, the second end of the cylinder hingedly affixed to the upper surface of the platform and capable of resting substantially perpendicular and adjacent thereto when in a use position, the cylinder being pivoted away from the platform when in an insertion position.

BRIEF DESCRIPTION OF THE DRAWINGS

In order that the present invention may be more fully understood it will now be described, by way of example, with reference to the accompanying drawings in which:

FIG. 1 is a perspective view of the preferred embodiment incorporating the principles of the present invention therein in use supporting a fishing rod;

FIG. 2 is a front view in elevation of the preferred embodiment;

FIG. 3 is an enlarged fragmentary view of the preferred embodiment taken in cross section;

FIG. 4 is an enlarged top view of one of the semi-resilient elements of the preferred embodiment; and FIG. 5 is a top view of the platform of the preferred embodiment.

DESCRIPTION OF THE PREFERRED EMBODIMENT

Referring now to the figures, and more particularly to FIGS. 1 and 2 thereof, there is illustrated therein a fishing rod holder 10 supporting a conventional fishing rod 12. The fishing rod 12 includes a handle portion 14 a pole portion 16 fixedly secured thereto, a reel 18 secured to the handle portion 14 and a length of fishing line 20. The fishing rod holder 10 includes a rigid substantially flat platform 22, a spike 24 inserted into the earth 26, and a hollow open-ended cylinder 28 pivotally affixed to the substantially flat platform 22. The hollow open-ended cylinder 28 forms a longitudinal chamber 30 therein as illustrated in FIG. 3. The handle portion 14 of the fishing rod 12 is inserted into the longitudinal chamber 30 of the hollow open-ended cylinder 28 and is secured in position as hereinafter described. A stabilizer 32 is fixedly secured to the spike 24. The stabilizer 32 is preferably shaped in the form of a truncated triangle. When the spike 24 is inserted into the ground, the lowermost portion 34 of the stabilizer 32 is also inserted into the earth 26 and precludes the rotation of the spike 24 about the longitudinal axis thereof.

FIG. 3 illustrates the hollow open-ended cylinder 28 in cross section. The cylinder 28 provides a first end 36 and a second end 38. The second end 38 of the hollow open-ended cylinder 28 is hingedly affixed to the platform 22 by a hinge 40. The second end 38 of the hollow open-ended cylinder 28 rests on the uppermost surface 42 of the rigid substantially flat platform 22 when the fishing rod holder 10 is in a use position as illustrated. When in the use position, the longitudinal axis of the hollow open-ended cylinder 28 is substantially perpendicular to the uppermost surface 42 of the rigid substantially flat platform 22. The end 44 of the spike 24 is fixedly secured to the lowermost surface 46 of the rigid substantially flat platform 22. The spike 24 is substantially perpendicular to the lowermost surface 46 of the flat platform 22 as illustrated. The handle portion 14 of the fishing rod 12 is inserted through the first end 36 of the hollow open-ended cylinder 28 and resides within the longitudinal chamber 30 thereof. The handle portion 14 is retained within the longitudinal open-ended chamber 30 by a plurality of semi-resilient elements 48 further illustrated in FIG. 4. The semi-resilient elements 48 are fixedly secured to the hollow open-ended cylinder 28 within the longitudinal chamber 30 thereof by a plurality of rivets 50. The hinge 40 is preferably of the spring urged butterfly type with the spring thereof urging the hollow open-ended cylinder 28 into the use position as illustrated.

FIG. 4 illustrates one of the semi-resilient elements 48 and is indicative of all of the semi-resilient elements 48. The semi-resilient elements 48 are substantially fork shaped as illustrated and provide a shank portion 52, a base portion 54 substantially perpendicular to the shank portion 52, and a plurality of substantially parallel tines 56 extending outwardly substantially perpendicular to the base portion 54. The shank portion 52, the base portion 54, and the parallel tines 56 are all disposed in the same plane. The shank portion 52 is preferably fixedly secured within the longitudinal chamber 30 of the hollow open-ended cylinder 28 in such a manner as to orient the common plane of the shank portion 52, the base portion 54, and the tines 56 in a position substantially perpendicular to the longitudinal axis of the longitudinal chamber 30. As a result, when the handle portion 14 of the fishing rod 12 is inserted into the longitudinal chamber 30, the tines 56 of the semi-resilient elements 48 bend around the handle portion 14 as illustrated in FIG. 3 and effectively secure the fishing rod 12 in position.

FIG. 5 is a top view of the fishing rod holder 10 in the insertion position. The hollow open-ended cylinder 28 is urged away from the rigid substantially flat platform 22 thereby providing a surface directly above the longitudinal axis of the spike 24. To effect insertion the user places his foot on the uppermost surface 42 of the flat platform 22 and pushes downwardly. After insertion is effected the hollow open-ended cylinder 28 is released and the spring urged butterfly hinge 40 urges the open-ended cylinder into a use position as illustrated in FIG. 3. The uppermost surface 42 is preferably provided with a plurality of sharp protrusions 58 which serve to induce friction when the foot of the user is placed thereon. The fishing rod holder 10 may be constructed of high impact plastic, light weight aluminum, or a similar suitable material. The semi-resilient elements 48 are preferably constructed of rubber or the like.

Therefore a primary advantage of the present invention is to provide a fishing rod holder which may be inserted positively into the ground with negligible risk of accident or injury to the user.

A further advantage is to provide a fishing rod holder which will not swivel in the ground once inserted therein.

A still further advantage is to provide a fishing rod holder which positively engages the handle of a fishing rod without requiring diligent fastening of clamps or other mechanical locking mechanisms.

Another advantage is to provide a fishing rod holder which may be manufactured in an extremely compact size.

Still another advantage is to provide a fishing rod holder which is simple to design, inexpensive to manufacture, and durable.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A fishing rod holder for use with a fishing rod having a handle adjacent one end thereof, comprising a rigid substantially flat platform having an upper surface and a lower surface, a spike fixedly secured to said lower surface of said platform, the longitudinal axis of said spike being substantially perpendicular to said lower surface, a hollow double open-ended cylinder forming a longitudinal chamber therein, said cylinder having a first open end and a second open end, said second end of said cylinder hingedly affixed to said upper surface of said platform, said second end of said cylinder being disposed in a use position when the longitudinal axis of said cylinder extends normal to said upper surface of said flat platform whereby said second end of said cylinder rests upon said upper surface of said flat platform forming a fishing rod handle holding chamber having the only one open end remaining located at said first end of said cylinder, said longitudinal axis of said cylinder being pivoted away from said use position into a fishing rod handle insertion position whereby said longitudinal axis of said cylinder forms an acute angle with said upper surface of said platform, means for releasably retaining said handle of said fishing rod in said cylinder when said handle is inserted into said longitudinal chamber through said first end of said cylinder whereby the longitudinal axis of said handle is at an acute angle to said longitudinal axis of said cylinder, said retention means including at least one semi-resilient element fixedly secured to a surface forming said handle holding chamber.

2. A fishing rod holder as claimed in claim 1, wherein said semi-resilient element is substantially fork shaped and provides a shank portion fixedly secured to said surface, a base portion substantially perpendicular to the base portion, and a plurality of substantially parallel tines extending outwardly substantially perpendicular to said base portion and disposed in the same plane as said shank portion.

3. A fishing rod holder as claimed in claim 2, wherein said shank is fixedly secured to said surface in such a manner as to orient said plane in a position substantially perpendicular to the longitudinal axis of said chamber.

4. A fishing rod holder as claimed in claim 1, wherein the uppermost surface of said platform is provided with a friction inducing finish.

5. A fishing rod holder as claimed in claim 1, wherein said cylinder is hingedly affixed to said platform by a spring urged butterfly hinge, said spring urged butterfly hinge urging said cylinder into said use position, said hinge being located at a marginal edge of said flat platform.

* * * * *